United States Patent Office 2,699,213
Patented Jan. 11, 1955

2,699,213

TREATMENT OF SUBSURFACE FORMATIONS

Paul H. Cardwell and Louis H. Eilers, Tulsa, Okla., assignors to The Dow Chemical Company, Midland, Mich., a corporation of Delaware No Drawing. Application July 27, 1953,
Serial No. 370,639

10 Claims. (Cl. 166—22)

The invention relates to methods of treatment of subsurface earth formations, such as those penetrated by the bore of a deep well. It more particularly concerns an improved method of treating a subsurface formation yielding oil, gas, water or brine so as to facilitate the flow of such fluid to a well formed in the earth formation.

Methods currently in use for treating earth wells, in which the treatment involves the injection of a treating liquid into the producing formation through the well hole, generally employ very high injection pressures. One of the objectives of using high injection pressures is to fracture the formation so as to produce in it cracks which communicate with the well hole. Cracks so produced are generally propped open by including in the treating liquid a particulated solid such as sand which remains in the cracks after the injection without blocking fluid flow. Production of fluid from a well in the so-cracked formation is thus facilitated. Such hydraulic fracturing or cracking of the producing formation of a well may be produced by means of a treating liquid which is either chemically reactive with the producing formations, e. g. hydrochloric acid, as in conventional acidization of wells, or chemically unreactive, e. g. petroleum oils, as in conventional well fracturing treatments. Thickening agents are sometimes added to the liquid used in the well fracturing treatment so as to permit higher treating pressures to be developed in the well hole without excessive rates of injection into the contiguous earth.

In making a treatment of the subsurface formations through a well bore the treating liquid, whether or not thickened, follows the lines of least resistance, thereby flowing into the more permeable portions while more or less by-passing the tighter portions, the fracturing of which is needed to facilitate fluid flow from them. Heretofore, attempts to prevent the treating liquid from by-passing the tighter portions of the formation in preference to entering the more permeable portions leave much to be desired.

The principal object of this invention is to provide an improved method of treating subsurface formations with a treating liquid whereby the treating liquid may be put under high pressure within the well hole without excessive penetration into the more permeable portions of the formation in preference to the tighter portions. A further object is to provide an improved method of fracturing a relatively tight portion of a subsurface formation contiguous to a relatively permeable portion penetrated by the same well hole. Other objects and advantages of the invention will appear as the description proceeds.

The invention is predicated upon the production of a more or less impervious deposit in the form of a filter cake of particulated rigid solids upon or within those portions of a well hole wall through which fluid under pressure in the well hole would tend to pass so that the fluid permeable portions of the formation become sealed by the filter cake as it forms. A plurality of solids is used for the filter cake which by chemical action among themselves in time are transformed into non-filterable substances so that the plugging action of the filter cake is but temporary, the time elapsing before the filter cake is destroyed being sufficient to permit carrying out a well fracturing treatment or the like.

The temporary plugging action obtained by the deposit of the filter cake permits the well bore to be put under high fluid pressure as in a fracturing operation without excessive loss of fracturing fluid. And after the fracturing operation is accomplished, the well may be put into production without hindrance from the filter cake as it is self-destroying.

In carrying out the invention, a wide variety of particulated solids may be used which on being mixed together form soluble reaction products or other non-obstructive products which are easily washed out of the formation after the filter cake has served its purpose.

In carrying out the invention, the filter cake of particulated solids is deposited from a liquid vehicle with which the solids are carried into the well hole as by injecting a suspension of the particulated solids in a liquid vehicle into the well hole and thence allowing the particulated solids to be strained out of the vehicle as it enters the pores of the earth formation forming a filter cake thereon of the particulated solids. In this procedure, it is manifest that the suspension follows the course of least resistance and thus first enters the more permeable portions of the earth formation. As these portions become clogged with the particulated solids which are strained out of the liquid vehicle the less permeable portions become covered with filter cake. Eventually, the entire fluid permeable face of the earth formation exposed in the well hole to the suspension becomes coated with a filter cake of the particulated solids wherever the liquid portion of the suspension can enter the formation and deposit the particulated solids as a filter cake which increases in thickness so long as the liquid vehicle carrying the solids in suspension can be forced through it into the formation at the injection pressures used. The injection is discontinued when a sufficient thickness of filter cake is deposited as indicated by the magnitude of the injection pressures or by the rate of injection. It is desirable to use a more or less viscous liquid as the vehicle for carrying into the well the particulated solids comprising the filter cake-forming material, the viscous liquid being inert to the particulated solids involved, such as an emulsion or a thickened petroleum oil, so that the particulated solids easily remain in suspension in the vehicle while undergoing injection into the well.

It is a feature of the invention that the particulated solids used to form the filter cake (which is self-destroying) react with each other to form reaction products which do not permanently plug the pores of the earth formation, the reaction products being either gaseous, liquid, or soluble in the ambient media. As an illustration, there may be used as the particulate filter cake-forming solids a mixture of particulated calcium hydroxide and ammonium chloride in stoichiometrical proportions as in the following equation:

$$Ca(OH)_2 + 2NH_4Cl = CaCl_2 + 2NH_3 + 2H_2O$$

The filter cake which may be formed from the mixture of calcium hydroxide and ammonium chloride is self-destroying. This fact is evident from the foregoing equation which shows that the reaction products are water-soluble and do not have the plugging action of the parent materials. The rate at which the filter cake destroys itself may be controlled by a suitable admixture of water with the particulated filter cake-forming materials when injected into the well. Hence, it is a further feature of the invention to provide a self-destroying well plugging material having a controlled rate of self-destruction.

One of the particular advantages of the use of a plugging material having the property of self-destruction is that one may use the plugging material to temporarily plug off a fluid permeable portion of an earth formation while subjecting a fluid tight contiguous portion of the formation to a high pressure fluid treatment to render it permeable without waste of fluid in the permeable portions and without permanently plugging these fluid permeable portions. Another advantage is that the self-destroying filter cake may be used in wells whose formations have been treated previously as by fracturing or acidizing. The filter cake so used enables such treated wells to be retreated without excessive loss of treating fluid into the previously formed cracks or passages.

The following example of a well treatment is illustrative of the practice of the invention in fracturing a formation penetrated by the well bore:

EXAMPLE

In a suitable tank, there was put 206 gallons of kerosene which was to serve as the vehicle for carrying in suspension the particulated solids for forming the self-destroying filter cake in the well hole. An emulsifier was added, e. g. Neofat S142 (an emulsifier comprising oleic acid 46 per cent, linoleic acid 39 per cent, linolenic acid 3 per cent, and rosin acids 12 per cent), in the amount of 17.5 gallons followed by 3.75 gallons of water. The foregoing liquids were stirred together for 1 to 2 minutes and then 350 pounds of dry slaked lime $(Ca(OH)_2)$ was slowly added while the stirring was continued. After the lime was thus mixed with the vehicle 525 pounds of pulverized ammonium chloride was added while the contents of the tank were stirred so as to produce a uniform admixture with the other ingredients. In this way, there was obtained about 7 barrels of a pumpable filter cake forming mixture ready for injection into the well hole. The well to be treated was provided with a string of tubing with its lower end at 2950 feet below the surface of the ground and a packer was set at 2907 feet. The well was prepared for the fracturing treatment by filling the annulus between the well casing and the tubing string with water after the packer was set. Two barrels of oil were pumped into the tubing followed by the 7 barrels of the plugging mixture (filter cake-forming) prepared as described. This was followed by 2 barrels of oil as a spacer and then a conventional fracturing mixture was injected. This comprised 24 barrels of an oil-water emulsion containing sand in suspension. As the injection proceeded the injection pressure ranged from about 800 to 1100 p. s. i. until the plugging mixture reached the face of the formation when the injection pressure rose to 1300 p. s. i. indicating that the plugging material was sealing off the permeable portions by depositing a filter cake of the admixture of lime and ammonium chloride particles. Continued injection of the emulsion containing the sand resulted in a decline in the injection pressure to 900–1000 p. s. i. indicating that fracturing of the formation was achieved. Following the injection of the emulsion containing the sand, 36 barrels of flushing oil was injected into the well so as to clear the well hole and tubing string of the emulsion-sand mixture and force it deeply into the earth formation. During this flushing operation, the injection pressure rose to 1200 p. s. i. and then dropped to a vacuum in 1.5 minutes. After the foregoing treatment, the well was tested to determine its production rate which then was 11 barrels of oil and 80 barrels of water per day. Prior to the treatment, the well was producing 1.5 barrels of oil and 20 barrels of water per day.

As aforesaid, a wide variety of particulated solid substances may be used for forming the self-destroying filter cake. Among the types of substances which in stoichiometrical proportions react together to form non-plugging material are solid acids and bases, and solid oxidizing and reducing substances, the rate of self-destruction depending upon the particular substances used and the proportion of water added, if any. This is illustrated on the following tabulations in which two particulated solids are mixed together in stoichiometrical proportions, suspended in kerosene, and the suspension filtered so as to form a filter cake of the particulated solids. In the tabulations, the data shows the elapsed time in hours between the deposition of the filter cake and its self-destruction by the chemical reaction of the constituent solids of the cake. In carrying out the filtrations, the filter and the filter cake obtained were maintained at the indicated temperature for the life of the cake.

TABLE I

*Solid inorganic acids with solid bases*

| Acid | Base | Hours Life of Filter Cake | |
|---|---|---|---|
| | | 150° F. | 210° F. |
| Boric | Sodium hydroxide | 18 | 1 |
| Silicic | ....do | | 14 |
| Arsenic trioxide (with 0.5 equivalent of water). | ....do | 28 | |
| Sulfamic acid | ....do | 1 | |
| Do | Sodium carbonate | 2 | |

TABLE II

*Solid organic acids with solid bases*

| Acid | Base | Hours Life of Filter Cake | |
|---|---|---|---|
| | | 80° F. | 150° F. |
| Oxalic | Sodium carbonate | ½ | |
| Do | Calcium carbonate | 1 | |
| Adipic | Sodium hydroxide | | 6 |
| Do | Sodium bicarbonate | 3 | ½ |
| Do | Ammonium bicarbonate | | 4 |
| Do | Sodium carbonate | | 4 |
| Fumaric | ....do | 3 | 16 |
| Do | Sodium hydroxide | 2 | 12 |
| Maleic anhydride | ....do | 24 | 5 |
| Do | Calcium carbonate | 2 | ½ |
| Citric | Sodium hydroxide | 2 | |
| Do | Sodium carbonate | 26 | 6 |
| Tartaric | Sodium hydroxide | 4 | |
| Benzoic | ....do | | 24 |
| Do | Ammonium bicarbonate | | 1 |
| Do | Calcium carbonate | | 1 |
| Salicylic | Sodium hydroxide | | 22 |
| Phthalic anhydride | ....do | 28 | 6 |
| Do | Calcium carbonate | 3 | ½ |

TABLE III

*Solid mineral acid salts of weak bases with inorganic bases*

| Acid | Base | Hours Life of Filter Cake | |
|---|---|---|---|
| | | 80° F. | 150° F. |
| Ammonium sulfate | Sodium hydroxide | 10 | 2 |
| Ammonium mono H phosphate | ....do | 16 | 4 |
| Ammonium thiocyanate | ....do | | 16 |
| Do | Calcium hydroxide | | 18 |
| Ammonium oxalate | Sodium hydroxide | | 9 |
| Ammonium citrate | ....do | | 24 |
| Do | Strontium hydroxide | | 1 |
| Ammonium chromate | Sodium hydroxide | | 16 |
| Ammonium dichromate | ....do | | 10 |
| Ammonium iodide | Calcium hydroxide | | 15 |
| Ammonium bromide | ....do | | 15 |
| Ammonium bifluoride | Sodium hydroxide | 10 | 2 |
| Ammonium carbonate | ....do | | 9 |
| Ammonium bicarbonate | ....do | 20 | 5 |
| Ammonium alum | ....do | | 8 |
| Do | Potassium hydroxide | | 5 |
| Ammonium acetate | Sodium hydroxide | | 8 |
| Do | Calcium hydroxide | | 5 |
| Ammonium nitrate | Magnesium hydroxide | | 25 |
| Hydrazine sulfate | ....do | | 8 |
| Hydroxylamine sulfate | ....do | | 5 |
| Hydrazine hydrochloride | Sodium hydroxide | | 8 |
| Guanidine hydrochloride | ....do | | 8 |
| Ethanolamine hydrochloride | ....do | | 3 |
| Ethylene diamine hydrochloride | ....do | | 2 |
| Do | Magnesium hydroxide | | 7 |
| Do | Barium hydroxide | | 2 |
| Do | Zinc oxide | | 24 |
| Butyl amine hydrochloride | Sodium hydroxide | | 0.2 |
| Octyl amine hydrochloride | Magnesium hydroxide | | 4 |
| N,N dioctyl amine hydrochloride | Sodium hydroxide | | 4 |
| Aniline hydrochloride | ....do | | 0.2 |
| Do | Magnesium hydroxide | | 0.5 |
| Aniline sulfate | ....do | | 0.3 |
| Do | Zinc oxide | | |
| Pyridine hydrochloride | Sodium hydroxide | | 0.3 |
| Quinoline hydrochloride | ....do | | ½ |
| Do | Magnesium hydroxide | | 1 |

TABLE IV

*Ammonium salt with bases*

| Salt | Base | Hours Life of Filter Cake 80° F. | Hours Life of Filter Cake 150° F. | Hours Life of Filter Cake 210° F. |
|---|---|---|---|---|
| Ammonium chloride | Magnesium hydroxide | | 30 | |
| Do | Sodium hydroxide | 18 | 4 | |
| Do | Potassium hydroxide | 24 | 6 | |
| Do | Lithium hydroxide | 32 | 5 | |
| Do | Zinc oxide | | 28 | |
| Do | Tin oxide | | | 6 |
| Do | Aluminum hydroxide | | 20 | over 24 |
| Do | Aluminum oxide | | 15 | |
| Do | Beryllium oxide | | 10 | |
| Do | Antimony trioxide | | | 20 |
| Do | Nickelous hydroxide | | | 18 |
| Do | Calcium sulfide | 6 | 1 | |
| Do | Barium sulfide | 5 | ½ | |
| Do | Calcium lactate | | 8 | |
| Do | Ferrous lactate | | 18 | |
| Do | Magnesium lactate | | | over 24 |
| Do | Manganese lactate | | | over 24 |
| Ammonium Nitrate | Calcium sulfide | | 1 | |
| Do | Zinc oxide | | 30 | 5 |
| Do | Aluminum hydroxide | | 8 | |
| Do | Aluminum oxide | | 4 | |
| Do | Beryllium oxide | | 6 | |
| Do | Antimony trioxide | | 15 | |
| Do | Nickelous hydroxide | | 2.5 | |
| Do | Ferrous lactate | | 6 | |
| Do | Calcium hydroxide | 30 | 6 | 1 |
| Do | Magnesium hydroxide | | 25 | |
| Do | Magnesium lactate | | | 16 |
| Do | Manganese lactate | | | 24 |

TABLE V

*Solid reducing agents with solid oxidizing agents*

| Reducer | Oxidizer | Hours Life of Filter Cake 80° F. | Hours Life of Filter Cake 150° F. | Hours Life of Filter Cake 210° F. |
|---|---|---|---|---|
| Hydroxylamine hydrochloride | Ammonium nitrate | | 1 | |
| Hydroxyl amine | Sidium nitrate | | 5 | |
| Hydroxyl amine hydrochloride | Ammonium persulfate | | 0.3 | |
| Hydrazine sulfate | Ammonium nitrate | | 1 | |
| Do | Sodium nitrate | | 10 | |
| Do | Potassium nitrate | | 12 | |
| Sulfamic acid | Ammonium nitrate | | 20 | |
| Paraform | do | | 1 | |
| Do | Sodium nitrate | | 12 | |
| Do | Potassium nitrate | | 15 | |
| Do | Sodium nitrite | | 10 | |
| Do | Sodium chlorate | | 5 | |
| Do | Potassium chlorate | | 10 | |
| Do | Sodium bromate | | 2 | |
| Do | Potassium iodide | | 6 | |
| Do | Potassium perchlorate | | 26 | |
| Do | Ammonium chromate | | 1 | |
| Do | Ammonium persulfate | | 0.5 | |
| Do | Hydroxylamine hydrochloride | | 0.5 | |
| Trioxane | Ammonium nitrate | | 0.5 | |
| Do | Sodium chlorate | | 2 | |
| Hydroquinone | Ammonium nitrate | | 7 | |
| Do | Sodium nitrate | | 24 | |
| Do | Sodium chlorate | | 16 | |
| Do | Sodium bromate | | 9 | |
| Do | Ammonium chromate | | | over 24 |
| Do | Ammonium dichromate | | | 11 |
| Do | Chromium trioxide | | | over 24 |
| Do | Ammonium persulfate | | | 4 7 |
| Do | Sodium borate | | 16 | |
| Catechol | Ammonium nitrate | | 5 | |
| Do | Sodium chlorate | | 15 | |
| O-Phenylene diamine | Ammonium nitrate | | 20 | |
| Do | Sodium chlorate | | 3.5 | |
| Do | Chromium trioxide | | 5 | |

| Reducer | Oxidizer | Hours Life of Filter Cake 80° F. | Hours Life of Filter Cake 150° F. | Hours Life of Filter Cake 210° F. |
|---|---|---|---|---|
| Oxalic acid | Ammonium nitrate | | 1.5 | |
| Do | Sodium nitrate | | 3 | |
| Do | Sodium chlorate | 2 | 0.2 | |
| Do | Hydroxylamine hydrochloride | | 1 | |
| Paraform | Ammonium nitrate | | 1 | |
| Do | Sodium nitrate | | 12 | |
| Do | Potassium nitrate | | 15 | |
| Do | Sodium nitrite | | 10 | |
| Hydroxylamine hydrochloride | Ammonium nitrate | | 1 | |
| Do | Sodium nitrate | | 5 | |
| Hydrazine sulfate | Ammonium nitrate | | 1 | |
| Do | Sodium nitrate | | 10 | |
| Do | Potassium nitrate | | 12 | |
| Catechol | Ammonium nitrate | | 5 | |
| Oxalic acid | Sodium nitrate | | 3 | |
| Sugar | Ammonium nitrate | | 72 | 2.5 |
| Do | Sodium nitrate | | | 10 |
| Paraform | Sodium chlorate | | 5 | |
| Do | Potassium chlorate | | 10 | |
| Do | Sodium bromate | | 2 | |
| Do | Potassium iodide | | 6 | |
| Do | Potassium perchlorate | | 26 | |
| Hydroquinone | Sodium chlorate | | 16 | |
| Do | Sodium bromate | | 9 | |
| Catechol | Sodium chlorate | | 15 | |
| Sugar | do | | 48 | 2.2 |
| Paraform | Ammonium chromate | | 1 | |
| Hydroquinone | do | | | over 24 |
| Do | Ammonium dichromate | | | 11 |
| Do | Chromium trioxide | over 24 | | 4 |
| O-Phenylene diamine | do | | 5 | |
| Cellulose | Ammonium persulfate | | | 10 |
| Paraform | do | | 0.5 | |
| Hydroxylamine hydrochloride | do | | 0.3 | |
| Cellulose | do | | | 10 |
| Do | Hydroxylamine hydrochloride | | | 20 |
| Do | Picric acid | | | 7 |
| Do | Zinc chloride | | | 20 |
| Do | Aluminum chloride | | | 16 |
| Wood flour | Picric acid | | | 6 |
| Do | Zinc chloride | | | 24 |
| Do | Sodium peroxide | | | over 24 |

Various liquids may be used for the suspending medium or vehicle by which the mixture of filter cake-forming materials is introduced into the well. Liquid petroleum fractions are preferred and may range from petroleum ether through the lubricating oils, such as SAE 30 motor oil. It is desirable to thicken the oils to increase their ability to hold in suspension the filter cake-forming materials as by mixing with the petroleum fraction a thickening agent, such as a fatty acid having from 16 to 18 carbon atoms in its chain. Examples of thickening agents are linolenic acid, oleic acid, recinoleic acid, and linoleic acid.

From the standpoint of cost and availability, a preferred pair of filter cake-forming materials is ammonium chloride and calcium hydroxide. These materials are finely divided and mixed together in more or less stoichiometrical proportions and suspended in kerosene with or without a little water to speed up the rate at which the filter cake formed from the mixture destroys itself. Suitable proportions range from 4 to 27 per cent by weight of ammonium chloride with from 7 to 22 per cent of calcium hydroxide, and from 2.6 to 6.6 per cent of thickening agent or emulsifier, the balance being kerosene with up to 3.5 per cent of water. In the following Table VI, the effect of including water in the suspending medium on the rate at which the filter cake becomes destroyed is illustrated.

TABLE VI

| Quarts of Water Added per Barrel of Suspension [1] | Hours Elapsed Before Self-Destruction of filter cake at ° F. 80° | Hours Elapsed Before Self-Destruction of filter cake at ° F. 150° | Hours Elapsed Before Self-Destruction of filter cake at ° F. 200° |
|---|---|---|---|
| none | 48 | 11 | 2 |
| 1 | 12 | 3 | ¼ |
| 2 | 4 | ⅚ | |
| 4 | 1 | ¼ | |
| 6 | ½ | ⅙ | |

[1] Same suspension composition as that used in the example of a well treatment.

It is desirable that the particulated solids be in the form of particles having a range of particle sizes such as from those small enough to pass through a No. 200 standard sieve to those large enough to be retained upon a No. 2 standard sieve, although other sizes may be used. In the case of ammonium chloride, a typical sieve analysis is the following:

| Sieve Size: | Per cent |
|---|---|
| 2 to 6 | 37.5 |
| 6 to 15 | 12.5 |
| 30 to 100 | 25 |
| 100 to 200 | 20 to 25 |
| 200 to 325 | 0 to 5 |

In the case of calcium hydroxide, a typical sieve analysis is the following:

| Sieve Size: | Per cent |
|---|---|
| 30 to 100 | trace |
| 100 to 200 | 5 |
| 200 to 325 | 20 |
| 325 and smaller | 75 |

By employing particles of various sizes, the filter cake is formed more readily as by the coarser particles first bridging across the larger openings in the formation followed by the finer particles bridging the openings between the coarser particles and then the finest particles bridging and closing the smallest openings forming a seal.

We claim:

1. A method of providing a temporary restraint to the passage of a liquid agent from a well bore into permeable portions of an earth formation penetrated by the well bore which comprises introducing into the well bore a suspension comprising at least two particulated solid materials dispersed in a liquid vehicle inert to the solid materials, said solid materials being capable of chemically interacting when in contact with each other and of being separable from the liquid vehicle by filtration; applying pressure on the suspension in the well bore so as to bring about separation of the solid materials from the vehicle to form a filter cake on the formation into which the vehicle passes when the pressure is applied, the filter cake so-obtained forming a temporary seal on the portions of the formation on which it deposits until chemical interaction between the solids so-brought together in the filter cake causes its destruction.

2. In a method according to claim 1 the use of a particulated solid acid substance and a particulated solid basic substance as the particulated solid materials.

3. In a method according to claim 1 the use of an ammonium salt of a strong mineral acid as one of the particulated solids and a solid base the cation of said base forming a water-soluble salt with the anion of the ammonium salt when the two solids react with each other.

4. In a method according to claim 1 the use of an ammonium salt as one of the particulated solids and a base selected from the group consisting of the alkali metal oxides, hydroxides, and carbonates, and the alkali earth metal hydroxides as another of the particulated solid materials.

5. In a method according to claim 1 the use of a particulated solid oxidizing agent and a particulated solid reducing agent capable of reducing the solid oxidizing agent as the particulated solid materials.

6. In a method according to claim 1 the use of particulated ammonium chloride and particulated calcium hydroxide as the particulated solid materials.

7. In a method according to claim 1 the use of a liquid petroleum fraction as the liquid vehicle.

8. In a method according to claim 1 the use of a liquid petroleum fraction containing in admixture up to 3.5 per cent of water as the liquid vehicle.

9. The method of treating an earth formation comprising both permeable and impermeable portions penetrated by the bore of a well with a liquid agent so as to restain the liquid agent from entering the permeable portions of the formation which comprises introducing into the well bore a suspension comprising at least two particulated solid materials dispersed in a liquid vehicle inert to the solid materials, said solid materials being capable of chemically interacting when in contact with each other and of being separable from the liquid vehicle by filtration; applying pressure on the suspension in the well bore so as to bring about separation of the solid materials from the vehicle to form a filter cake on the formation into which the vehicle passes when the pressure is applied, the filter cake so-obtained forming a temporary seal on the portions of the formation on which it deposits until chemical interaction between the solids so-brought together in the filter cake causes its destruction; and before the filter cake is chemically destroyed introducing into the well the liquid agent and applying pressure thereon so as to force liquid agent into the earth formation.

10. The method according to claim 9 in which the liquid vehicle comprises a liquid petroleum fraction and contains up to 3.5 per cent of water.

References Cited in the file of this patent

UNITED STATES PATENTS

| 1,870,320 | Adams et al. | Aug. 9, 1932 |
| 2,272,672 | Kennedy | Feb. 10, 1942 |
| 2,547,778 | Reistle | Apr. 3, 1951 |